Dec. 3, 1968 J. D. MORRISON 3,414,151
LINERLESS PLASTIC CLOSURES
Filed Jan. 6, 1967
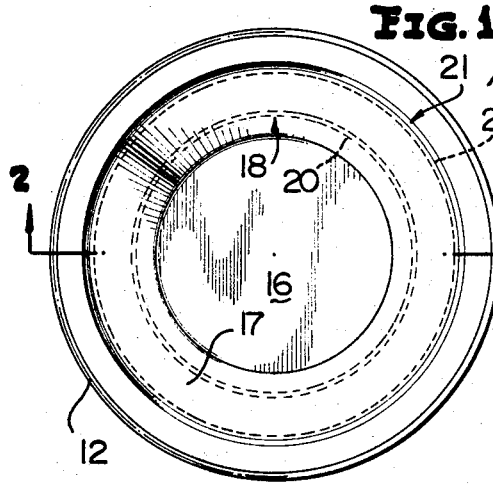
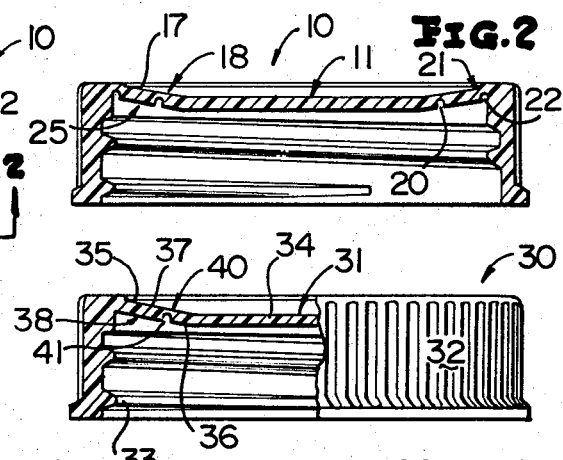
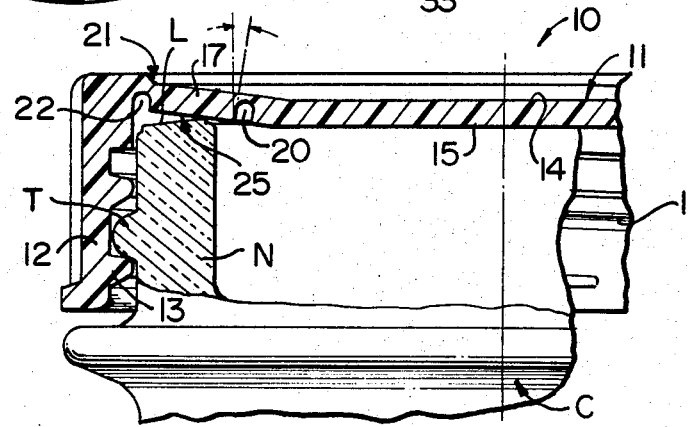
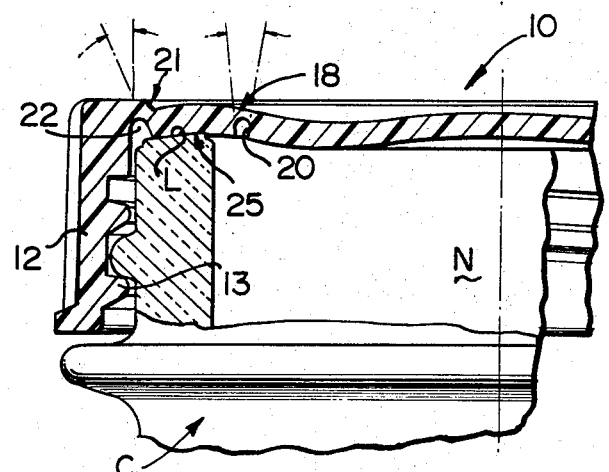
INVENTOR
JOHN D. MORRISON
BY Mason, Porter, Diller & Brown
ATTORNEYS

United States Patent Office 3,414,151
Patented Dec. 3, 1968

3,414,151
LINERLESS PLASTIC CLOSURES
John D. Morrison, Glen Ellyn, Ill., assignor to J. S. Plastics Inc., Naperville, Ill., a corporation of Illinois
Filed Jan. 6, 1967, Ser. No. 607,696
4 Claims. (Cl. 215—40)

ABSTRACT OF THE DISCLOSURE

This disclosure relates to a linerless closure which includes an end panel defined by a central wall portion which merges gradually with a radially outermost annular wall portion, the annular wall portion having an inner annular sealing surface inclined radially inwardly and downwardly relative to the axis of the closure, and a pair of hinge means in the form of continuous annular generally U-shaped grooves opening outwardly through the inner annular sealing surface for permitting the deflection of the outermost annular wall portion to bring the inner sealing surface thereof into conforming relationship with a lip of an associated container closed by the linerless closure.

It is a conventional to form closures of metal, plastic or similar material, and incorporate a separate gasket in each closure to produce a tight seal with an associated container lip. Such gaskets are generally constructed from cork, rubber, plastic, pulp, paper or similar material which is relatively pliable and deformable under the sealing pressures encountered upon the application of the closures to associated containers. Such multi-piece closures have heretofore proved acceptable, but unfortunately possess many disadvantages, primary among which is the high cost of manufacture due to the necessity of forming the closure and gasket independently of each other and thereafter assembling these individual components.

In view of the relatively high cost of production of such multi-piece closures, the closure industry has recently turned to the manufacture of one-piece "linerless" closures. Such closures are generally molded from plastic material, and either include a cylindrical plug which is adapted for insertion into a container mouth or include an annular axially downwardly directed "fin" which forms a seal with the axial face of a container lip.

Each of these linerless-type closures has certain disadvantages but in general the plug-type closure is less reliable than the fin-type closure. In the case of plug-type linerless closures the plug is generally formed as a depending annular boss which is relatively rigid and is designed for wedging sealing engagement with the interior surface of a container mouth. However, during the production of standard plastic or glass containers the finishes are not held within tight internal diameter tolerances. For example, in the blow-molding of plastic containers a tube of plastic material is extruded in a conventional manner, a portion of the tube is clamped-off by a split mold and the clamped-off portion of the tube is expanded to the exterior configuration of the split mold cavities. The cavities thereby maintain desired external tolerances but the internal tolerances vary appreciably due to such factors as, for example, the pressure of the air injected into the clamped-off portion, variations in the wall thickness of the clamped-off portion, etc. Thus, while plug-type linerless closures are appreciably less expensive than multi-piece closures the reliability is materially less than that which is commercially desirable and it is often necessary to exactly "tailor" such closures to specially manufactured high-tolerance containers.

A major disadvantage of the "fin-type" linerless closures is the high cost of manufacture thereof due to the necessity of intrically constructed molds and associated cores. The annular sealing fins of such closures are generally directed downwardly from an end panel of the closure and are inclined either radially outwardly or radially inwardly. The cores are therefore in most cases necessarily constructed from two pieces which, of course, involves additional expense. During the molding of such closures by conventional methods (injection molding) care must be taken that the annular sealing fins are "set" before the cores are removed otherwise the sealing fins would be deformed to a configuration other than that desired.

In keeping with the above it is a primary object of this invention to provide a novel linerless plastic closure which overcomes the above and other disadvantages of conventional linerless closures while providing numerous advantages both from the standpoint of manufacturing costs and the efficiency of the seals produced thereby.

Another object of this invention is to provide a novel linerless plastic closure defined by an end panel and a depending peripheral skirt, the peripheral skirt including means for securing the closure to a container, annular sealing means defined by an integral annular wall portion of the end panel adjacent the peripheral skirt, and annular hinge means positioned radially adjacent the annular sealing means for effecting the deflection of the annular sealing means under the influence of forces created upon the application of the closure to an associated container.

Still another object of this invention is to provide a novel linerless closure of the type immediately heretofore described wherein the annular wall portion is normally inclined radially inwardly and downwardly relative to the axis of the closure and the annular hinge means effects the deflection of the annular sealing means to a position generally normal to the closure axis.

Yet another object of this invention is to provide a linerless closure constructed in the manner heretofore defined wherein the hinge means is positioned radially inwardly or both radially inwardly and outwardly of the annular sealing means.

A further object of this invention is to provide a linerless closure of the type just described wherein the hinge means are a pair of continuous annular grooves formed in an inner surface of the closure end panel.

With the above and other objects in view that will hereinafter appear, the nature of the invention will be more clearly understood by reference to the following detailed description, the appended claimed subject matter, and the several views illustrated in the accompanying drawing.

In the drawing

FIGURE 1 is a top plan view of a novel linerless closure constructed in accordance with this invention, and illustrates a pair of concentric circular grooves formed in the interior surface of an end panel of the closure.

FIGURE 2 is a sectional view taken generally along line 2—2 of FIGURE 1, and illustrates a radially inwardly and downwardly inclined annular sealing wall set off between the grooves, and an internal thread carried by a peripheral skirt of the closure.

FIGURE 3 is a fragmentary sectional view partially in side elevation of the closure of FIGURES 1 and 2, and illustrates the relative position of the annular sealing wall and an associated lip of a container prior to tightening the closure upon the container.

FIGURE 4 is a view similar to FIGURE 3, and illustrates the deflected position of the sealing wall after the closure has been tightly secured to the container.

FIGURE 5 is a view partly in cross section and partly in side elevation of another linerless closure constructed in accordance with this invention, and illustrates a single circular groove defining a hinge zone radially outboard of which is a radially inwardly and downwardly inclined annular sealing wall.

A novel linerless closure constructed in accordance with this invention is fully illustrated in FIGURES 1 through 3 of the drawing, and is generally designated by the reference numeral 10. The closure 10 is of a one-piece construction, and is preferably constructed from copolymeric thermoplastic material, such as polypropylene, polyethylene or polystyrene by a conventional injection molding process.

The linerless closure 10 includes an end panel, generally designated by the reference numeral 11, and a depending integral peripheral skirt 12 provided with means 13 in the form of a screw thread for securing the closure 10 to an associated container C, in a manner which will be described more fully hereafter. While the means 13 is preferably a screw thread, it is to be understood that similar conventional means may be employed in lieu thereof such as, for example, circumferentially spaced locking lugs or any other conventional means which, when the closure 10 is associated with the container C, an axial force is created sufficient to deflect a portion of the end panel 11, as will appear more fully hereafter.

The end panel 11 includes an outer surface 14 and an inner surface 15 defining therebetween a predetermined wall-thickness of the end panel 11. The end panel 11 further includes a generally circular central panel portion 16 (FIGURE 1) and an annular wall portion 17 joined to each other by annular hinge means, generally designated by the reference numeral 18. The annular hinge means 18 is formed by a reduction in the wall thickness of the panel 11 by means of an axially downwardly opening annular groove 20. Additional hinge means, generally designated by the reference numeral 21 join the annular wall portion 17 to the peripheral skirt 12. The hinge means 21 is similarly defined by an axially downwardly opening annular groove 22. In the normal position of the closure 10 (FIGURES 1 through 3) the radially opposed walls (unnumbered) of the groove 22 are in coaxial relationship with each other and with the axis of the closure 10 while the radially opposed annular walls (also unnumbered) of the groove 20 are inclined between 6 to 10 degrees relative to the closure axis, as indicated by the opposing unnumbered headed arrows in FIGURE 3 of the drawing.

Referring particularly to FIGURES 1 and 2 of the drawing, the annular wall portion 17 includes annular sealing means, generally designated by the reference numeral 25. The sealing means 25 is an annular sealing surface which, like the annular wall portion 17, is inclined radially inwardly and downwardly relative to the closure axis. The inclination of the sealing surface or sealing means 25 and the annular wall portion 17 of the closure 10 is also preferably between 6 to 10 degrees.

The container C includes an upstanding neck or finish N having a screw thread T on the exterior thereof and a peripheral terminal face of lip L. Once a product has been packaged into the container C, the closure 10 is initially positioned thereon with the leading portion of the closure thread 13 underlying the container thread T and the annular sealing surface 25 in light contacting relationship with a portion of the container lip L (FIGURE 3). As the closure 10 is rotated the cooperative threads 13, T draw the peripheral skirt 12 axially downwardly which in turn progressively urges the annular sealing surface 25 into complete sealing contact with the container lip L, as shown in FIGURE 4 of the drawing. During the downward movement of the peripheral skirt 12 the end panel 11 temporarily deforms to the configuration thereof shown in FIGURE 4 by virtue of the hinge means 18, 21 which permit both the annular wall portion 17 and the circular central wall portion 16 to deflect in the manner clearly illustrated in FIGURE 4 of the drawing. During this deflection which is temporary, the annular walls of the groove 20 converge toward each other in a downward direction and define therebetween an angle of approximately 15 degrees while the walls of the groove 22 are spread into downwardly diverging relationship to define therebetween an angle of approximately 25 to 30 degrees. The circular central panel 16 of the closure 10 also deforms temporarily, in the manner clearly illustrated in FIGURE 4 of the drawing, but upon the removal of the closure the same rebounds under internal stresses to the original configuration (FIGURES 1 through 3) and can be repeatedly applied to and removed from the container C as may be found necessary or desirable.

Another linerless plastic closure constructed in accordance with this invention is illustrated in FIGURE 5 of the drawing, and is generally designated by the reference numeral 30. The closure 30 is preferably constructed from the same material as the closure 10 by, for example, an injection molding operation.

The closure 30 is quite similar to the closure 10 and includes an end panel 31 and an integral depending peripheral skirt 32 having internal thread means 33 for attaching the closure to an associated container. Other conventional means may, of course, be employed in lieu of the thread means 33.

The end panel 31 is of a predetermined thickness and includes a generally circular central panel portion 34 and an annular wall portion 35 which merges with the central panel portion 34 at an annular juncture 36. The annular wall portion 35 includes opposite surfaces 37, 38 which converge radially inwardly and downwardly toward the juncture 36, and the surface 38 defines means for sealing the lip of an associated container in the same manner as the sealing means 25 of the closure 10. The surface 38 is also preferably inclined approximately 6 to 10 degrees relative to the axis of the closure 30.

The annular wall portion 35 is provided with annular hinge means 40 formed by an annular or circular groove 41 opening radially downwardly, and the annular opposing walls (unnumbered) of the groove 41 are also inclined relative to the axis of the closure 30 in the manner of the annular walls (unnumbered) of the groove 20.

The linerless closure 30 is applied to a container, such as ths container C, in the manner heretofore described with respect to the closure 10 and functions basically in an identical manner. The annular hinge means 40 permits the central panel portion 34 and the annular wall portion 35 to deflect relative to each other causing the sealing means 38 to similarly temporarily deform to a generally horizontal position at which time the sealing means is in firm sealing contact with the lip of an associated container. The major difference between the closures 10 and 30 is the absence in the latter of a groove corresponding to the groove 22 and the associated hinge means 21. Thus, when the closure 30 is applied to a container a greater force is necessary to bring the sealing surface 38 into intimate sealing engagement with an associated container lip.

It is to be particularly noted that in the construction of each of the closures 10, 30 it is unnecessary to employ complex molds and completely unnecessary to employ multi-part cores. Thus, the initial expenditures for producing molds in which the closures 10, 30 are formed is appreciably less than the cost of manufacturing molds associated with conventional linerless closures of the type earlier mentioned. It should also be noted that the closures 10, 30 are devoid of any type of intricate sealing members, such as the annular sealing fins heretofore noted, and the closures are highly efficient irrespective of either the external or internal deviations of the container neck or finish N from desired tolerances.

I claim:

1. A linerless closure adapted for sealing engagement with an associated container comprising an end panel and a depending peripheral skirt, said peripheral skirt having means for securing the closure to a container, said end panel being defined by a central wall portion and a radially outermost annular wall portion, said annular wall portion having an inner annular sealing surface inclined radially inwardly and downwardly relative to the axis of the closure, said annular wall portion having an outer annular surface generally parallel to said inner annular sealing surface and merging with an outer circular surface of said central wall portion, first hinge means opening outwardly through the inner annular sealing surface contiguous the point of merger thereof with an inner circular surface of said central wall portion, second hinge means opening outwardly through the inner annular sealing surface adjacent an inner surface of the peripheral skirt, said first and second hinge means each being in the form of a continuous annular generally U-shaped groove, said grooves being in concentric relationship with each other and with the closure axis, and a plane taken through said outer circular surface being disposed below an axially innermost portion of said outer annular surface whereby said central wall portion is the axially innermost portion of said end panel.

2. The linerless closure as defined in claim 1 wherein the inclination of the inner annular sealing surface ranges between 6 to 10 degrees relative to a plane normal to the closure axis.

3. The linerless closure as defined in claim 2 wherein each U-shaped groove is inclined between 6 to 10 degrees relative to the closure axis.

4. The linerless colsure as degned in claim 1 wherein each U-shaped groove is inclined between 6 to 10 degrees relative to the closure axis.

References Cited

UNITED STATES PATENTS

| | | | |
|---|---|---|---|
| 2,586,775 | 2/1952 | Benner et al. | 215—43 |
| 2,914,206 | 11/1959 | Lowen | 215—43 X |
| 3,080,993 | 3/1963 | Livingstone | 215—41 X |
| 3,160,303 | 12/1964 | Healy | 215—43 X |
| 3,244,308 | 4/1966 | Esposito | 220—24.5 X |
| 3,255,908 | 6/1966 | Braun | 215—43 |

FOREIGN PATENTS

| | | |
|---|---|---|
| 741,856 | 12/1955 | Great Britain. |
| 1,004,277 | 9/1965 | Great Britain. |

D. F. NORTON, *Primary Examiner.*